INVENTORS
YASUO FUKUYAMA
YOSUKE OKADA

United States Patent Office 3,490,119
Patented Jan. 20, 1970

3,490,119
POLYURETHANE RUBBER COVERED ROLL
Yasuo Fukuyama and Yosuke Okada, Hirakata-shi, Japan, assignors to Yamauchi Rubber Industry Co., Ltd., Osaka, Japan, a corporation of Japan
Filed Oct. 23, 1968, Ser. No. 769,844
Int. Cl. B21b 31/08
U.S. Cl. 29—132                      1 Claim

ABSTRACT OF THE DISCLOSURE

This polyurethane rubber covered roll consists of a metal core fixed by winding with the fiber previously impregnated with thermosetting resin solution to form a substratum and then polyurethane rubber layer is cast molded on the periphery of said substratum.

BACKGROUND OF THE INVENTION

Field of the invention

The present invention relates to a polyurethane rubber covered roll for use in the industries such as paper, textile, iron and steel, etc. and more particularly to the polyurethane rubber covered roll having a metal roll core fixed by winding with the fiber previously impregnated with thermosetting resin solution to form a substratum and said substratum, before or after the hardening of said resin solution, is fixed by cast-molding with a polyurethane rubber layer with or without applying a bonding agent to the surface.

Description of the prior art

The conventional roll cores, especially those large in size which have almost exclusively been made of cast iron because of the lower cost, are known to have the drawbacks such as the brittleness in quality of the material and the presence of the pinholes on the surface liable to grow foam in the layer of the bonding agent whereby reducing the bonding strength between the roll and the polyurethane rubber layer.

Other than said cast iron roll core, stainless steel or bronze or aluminum roll core is also used. These roll cores are higher in strength and more excellent than cast iron core giving no pinholes on the surface. But, because of their high stability against chemicals, they tend to show a poor bonding result with polyurethane rubber layer. And, polyurethane rubber is high in strength and also in resistance to wear and tear—the strength is usually stronger than the bonding strength between the roll core, made of cast iron, stainless steel, bronze, aluminum, etc., and polyurethane rubber and in result when the conventional polyurethane rubber covered roll using said metal cores is operated under heavy load and at high revolution rate the polyurethane rubber layer tends to strip off from the roll core before polyurethane rubber layer breaks.

To eliminate the causes of these drawbacks the following two attempts were made:

(1) To use the roll core having coarser surface.
(2) To form an ebonite layer on the roll core.

The above method (1) ended in failure because the coarse surface was liable to grow foam in the layer of bonding agent and caused stripping of the layer.

The method (2) also ended in failure because on casting polyurethane rubber on ebonite layer it was found extremely difficult to use cast-molding to form polyurethane rubber layer corresponding in strength to that of ebonite and the great difference in the strength between the two makes it impracticable to bond ebonite layer with polyurethane rubber layer without going the risk of the polyurethane rubber layer strip off in operation under a heavy load and at high revolution rate.

As stated in the foregoing, the above two methods (1) and (2) were found unable to obtain successful results.

Summary of the invention

An object of this invention is to overcome the drawbacks as stated in the foregoing inherent with the conventional polyurethane rubber covered roll and to offer an improved one made by fixing by winding around the roll core with the fiber previously impregnated with thermosetting resin solution and the surface of the substratum thus obtained, before or after the hardening of said resin solution, is cased with polyurethane rubber layer formed by cast molding, with or without using bonding agent, and the product thus obtained is free from such trouble as stripping of the layer from the roll core.

Another object of this invention is to provide an improved polyurethane rubber covered roll free from stripping trouble during operation under heavy load and at high evolution rate by impregnating the fiber filaments such as glass fiber, nylon, polyester, etc. in the solution of the thermosetting resins like epoxy resin, polyester resin, diallyl phthalate, etc., the fiber impregnated in thermosetting resin solution fixed by winding to the surface of the roll core in a proper thickness to form a layer of the fiber impregnated in thermosetting resin solution, the surface of said fiber layer, before or after the curing of said layer, is cast with polyurethane rubber layer formed by cast-molding with or without using a bonding agent, and the three elements, that is the roll core, the fiber layer, and the polyurethane rubber layer, are incorporated in a solid body by a perfect bonding.

Another object of this invention is to provide an improved polyurethane rubber covered roll in which cast iron roll core is used but the brittleness of said cast iron core is remedied by the structural strength of the roll reinforced by the perfect bonding of the fiber layer to the core owing to the compressive force used when winding and also the stronger bonding of fiber filaments among themselves because of the thermosetting resin impregnated in them and the growth of foam between the core and the fiber layer is entirely prevented.

Still another object of this invention is to provide an improved polyurethane rubber covered roll in which roll core made of the metals other than cast iron, for example, stainless steel, aluminum, bronze known to be unyielding to the action of bonding agent, but nevertheless polyurethane rubber layer is firmly formed on the top of the substratum of fibers impregnated in thermosetting resins and thereby eliminates the cause of stripping of resin layer.

A further object of this invention is to provide a method by which polyurethane rubber covered roll can be made at a reduced cost by saving the thickness of polyurethane rubber, higher in cost, with the fiber layer, lower in cost, as well as strengthening the bond between polyurethane rubber layer and the fiber layer by using thermosetting resin impregnated in the fiber.

DETAILED DESCRIPTION OF THE INVENTION

The present invention is to provide an improved polyurethane rubber covered roll for use in the industries such as paper, textile, iron and steel, etc.

Figure 1:
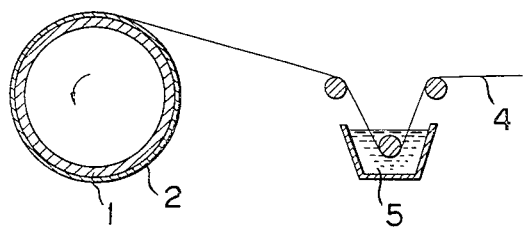
FIG. 1 is a sketch of cross-section of the roll etc. showing how the fiber is fixed by winding around the roll core.
Figure 2:
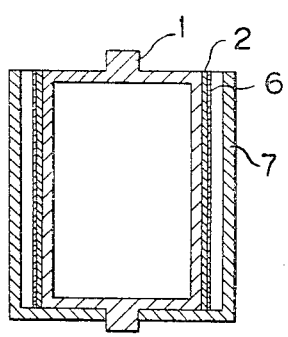
FIG. 2 is a vertical section of the roll and casting mold.
Figure 3:
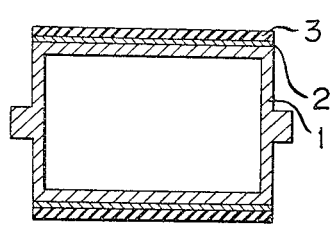
FIG. 3 is a longitudinal section of the polyurethane rubber covered roll disclosed by this invention.

In FIG. 1, the roll core 1 is made of the metals such as cast iron, stainless steel, bronze, aluminum, etc., said roll core 1 rotates to take up by winding fiber 4, for example, glass fiber, nylon, polyester, etc., with filaments fully impregnated in advance with the thermosetting resins, such as epoxy, polyester, diallylphthalate, etc. by dipping into their solution, forming thereby a fiber layer 2 in desired thickness around the roll core 1. This roll having said fiber layer 2, before or after the hardening of the thermosetting resin and with or without giving to the surface a proper trimming and also applying or not applying a bonding agent to the surface, is placed in the casting mold 7 as shown in FIG. 2 and then polyurethane resin is poured into the mold so that polyurethane rubber layer 3 is formed around the roll.

In the following, further explanation will be made on how this invention rubber covered roll is made with reference to several examples given below.

Example 1

In this example, polyurethane rubber covered roll was made of the following:

A cast iron roll core.—2 meters long and 600 mm. in diameter, (generally the proportion length/diameter $< 5$ is recommended.) Distortion test $1 \times 10^{-6}$ maximum. Groove cut in the periphery 2.5 mm. apart.

Fiber.—Glass roving made of $9\mu$ glass fiber previously processed by Volan treatment.

Thermosetting resin.—Epoxy resin (solution of the mixture of Epikote 815 of Shell Oil Co. 100 parts and triethylene tetramine 10 parts.)

As shown in FIG. 1, the roll core 1 takes up by winding the fiber 4 impregnated in epoxy resin in the weight ratio, fiber 2 to resin 1, while giving tension 10 kg. until the fiber layer 2 reaches 4 mm. in thickness. Thereupon the roll newly provided with the fiber layer was placed in the casting mold designed to give when molded polyurethane rubber layer 25 mm. thick on the fiber layer. Into the interspace between the mold and the roll, the molding solution of polyurethane elastomer, the defoaming mixture of 100 parts of Adiprene L-100 made by Du Pont and 12 parts of (methylenbisco-O-chloroaniline), is poured. And after the casting was hardened with drying process for 10 hours at 100° C., it was cooled down to the normal temperature and released from the mold and trimming was given to the surface by abrasion until the final product roll had polyurethane rubber layer 3 20 mm. in thickness.

The product polyurethane rubber covered roll was found capable to endure operation under the load 240 kg./cm. and at the rate of 100 r.p.m. under the normal temperature. The standard sample of the polyurethane rubber covered roll having polyurethane rubber layer directly attached to the roll core by an isocyanate type bonding agent without resin-impregnated fiber layer showed stripping of the rubber layer when operated under the load 160 kg./cm. all other conditions same as the above.

Example 2

In this example, polyurethane rubber covered roll was made of the following:

A cast iron roll core.—2 meters long and 300 mm. in diameter. Flexure test in the maximum range from $1 \times 10^{-6}$ to $1 \times 10^{-4}$. Screw thread cut in the periphery in pitch from 1 to 6 mm.

Fiber.—Glass roving made by the Nitto Bo, Ltd. made of glass fiber, GYR-60-FWE.

Thermosetting resin.—Epoxy resin, mix solution of 100 parts of Araldite GY-250, 80 parts of acid anhydride hardener, HHPA, and 2 parts of accelerator, tertiary amine BDMA.

The cast iron roll processed as described above, takes up by winding the fiber 4 impregnated in the resin 5 in the range from 40:60 to 80:20 in weight ratio slantways by 50° C. and reversing the direction alternately layer after layer while giving tension 10 kg. toward the axis. The winding continued until the fiber layer reached from 2 to 5 mm. in thickness. Then the fiber layer of the roll was hardened with heating process for 4 hours at 100° C., for 5 hours at 150° C. for 9 hours in total and the surface of the fiber layer 2 was given trimming by a lathe to give a smooth surface. The semi-product roll thus obtained was placed upright and was applied on the surface an isocyanate-based adhesive 6 and put into the casting mold and the interspace was filled with polyurethane elastomer in the same way as described in Example I and was hardened with heating process for 5 hours at 100° C. and after giving the finishing processing as described in Example I, the finished polyurethane rubber covered roll was obtained. The product polyurethane rubber roll was found to be free from any cracks liable to occur in the resin-impregnated fiber layer owing to the distortion of roll core.

Example 3

In this example, polyurethane rubber covered roll was made of the following:

Aluminium roll core.—2 meters long, 40 mm. thick, and 600 mm. in outer diameter.

Fiber.—Polyethylene terephthalate roving, 20 denier.

Thermosetting resin.—Epoxy resin, as used in Example I.

The fiber impregnated with said resin in the weight ratio fiber 1:resin 1 was taken up by winding by the aluminium cored roll while giving tension 10 kg. to the periphery. The winding was continued until the fiber layer reached 3 mm. in thickness and the resin-impregnated fiber layer was hardened with leaving it to stand for 2 hours at the normal temperature and then followed the cast molding process as explained in Example II to produce polyurethane rubber roll. The product polyurethane rubber covered roll was found to be free from any stripping of the rubber layer from the aluminum roll core.

Example 4

In the present example, polyurethane rubber covered roll was composed of the following:

Stainless steel or bronze roll core.—Suction roll for use in the paper making machine, 3.5 meters long, 30 mm. thick, and 500 mm. in outer diameter, provided with 90,000 holes, each 3 mm. in diameter, perforated all over, and grooves, 1 mm. deep, cut 3 mm. apart.

Fiber.—Glass cross tape, ECL-9230-65, made of non-alkali type glass fiber, 0.23 mm. thick and 65 mm. wide, made by the Nitto Bo and glass roving, GYR-60-FWE, made by the Nitto Bo.

Thermosetting resin.—Epoxy resin (solution of the mixture of 100 parts of Araldite GY252, and 23 parts of Araldite HY974.)

The aforesaid two types of the fiber, namely glass cross tape 4' and glass roving 4" previously impregnated in the resin in the range from 40:60 to 80:20 are alternately taken up by winding by the core roll 1 while giving tension 10 kg. until each layer reaches 1 mm. in thickness. Then the roll was left to stand for 6 hours at the normal temperature to harden.

Figure 4:
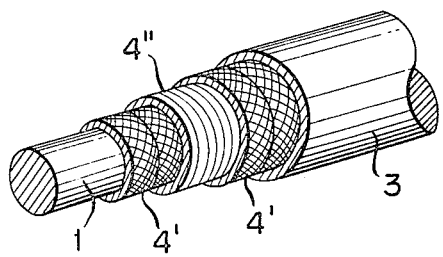
FIG. 4 shows another embodiment of the invention roll partly cut away.

Then the surface of the fiber layer 2 was trimmed smooth by abrasion and the cast molding was performed as explained in Example II and polyurethane rubber covered roll was obtained (see FIG. 4).

By this example, it was found that the suction roll for paper making machine perforated with a plurality of small holes is capable to be used for a core roll for making polyurethane rubber roll eliminating the need of new core roll specially for the purpose.

What is claimed is:

1. A polyurethane rubber-covered roll, comprising a metal roll core, a fiber layer impregnated with a thermosetting resin and wrapped on and united to the periphery of said core, and a polyurethane rubber layer encircling and united to said fiber layer.

References Cited

UNITED STATES PATENTS

| | | | |
|---|---|---|---|
| 2,992,939 | 7/1961 | Larson et al. | |
| 3,024,153 | 3/1962 | Kennedy | 156—87 |
| 3,030,696 | 4/1962 | Serwer | 29—132 X |
| 3,193,441 | 7/1965 | Schafer | 264—257 X |
| 3,218,215 | 11/1965 | Achterhof et al. | |
| 3,237,433 | 3/1966 | Voleman et al. | 29—132 X |
| 3,293,728 | 12/1966 | Hill | 29—132 |

MORRIS KAPLAN, Primary Examiner

Notice of Adverse Decision in Interference

In Interference No. 97,504 involving Patent No. 3,490,119, Y. Fukuyama and Y. Okada, POLYURETHANE RUBBER COVERED ROLL, final judgment adverse to the patentees was rendered June 30, 1971, as to claim 1.

[*Official Gazette August 10, 1971*]